US012309560B1

(12) United States Patent
Liao et al.

(10) Patent No.: US 12,309,560 B1

(45) Date of Patent: May 20, 2025

(54) AUDIO CALIBRATION METHOD AND SYSTEM, AND STORAGE MEDIUM

(71) Applicant: Linkplay Technology Inc., Newark, CA (US)

(72) Inventors: Dongsheng Liao, Newark, CA (US); Pu Yang, Newark, CA (US); Jiaxin Li, Newark, CA (US); Ning Liu, Newark, CA (US); Qi Wang, Newark, CA (US); Lifeng Zhao, Newark, CA (US)

(73) Assignee: Linkplay Technology Inc., Newark, CA (US)

( * ) Notice: Subject to any disclaimer, the term of this patent is extended or adjusted under 35 U.S.C. 154(b) by 0 days.

(21) Appl. No.: 19/023,381

(22) Filed: Jan. 16, 2025

(30) Foreign Application Priority Data

Sep. 5, 2024 (CN) ........................ 202411241898.1

(51) Int. Cl.
*H04R 3/04* (2006.01)

(52) U.S. Cl.
CPC .................................... *H04R 3/04* (2013.01)

(58) Field of Classification Search
CPC ...... H04R 3/04; H04R 1/1041; H04R 29/001; H04R 29/00; G06F 3/165; H03G 5/165; H03G 5/025; H04S 7/301; H04S 7/30; H04S 7/307; H04S 7/00
See application file for complete search history.

(56) References Cited

U.S. PATENT DOCUMENTS

| | | | | |
|---|---|---|---|---|
| 2010/0290643 | A1* | 11/2010 | Mihelich | H04S 7/301 381/103 |
| 2016/0366518 | A1* | 12/2016 | Strogis | H04R 3/04 |
| 2017/0200442 | A1 | 7/2017 | Yamabe et al. | |

(Continued)

FOREIGN PATENT DOCUMENTS

| | | | |
|---|---|---|---|
| CN | 116208700 | A | 6/2023 |
| CN | 116782084 | A | 9/2023 |
| CN | 117130576 | A | 11/2023 |

(Continued)

OTHER PUBLICATIONS

First Office Action issued in counterpart Chinese Patent Application No. 202411241898.1, dated Oct. 21, 2024.

(Continued)

*Primary Examiner* — Yogeshkumar Patel
(74) *Attorney, Agent, or Firm* — Westbridge IP LLC

(57) ABSTRACT

Disclosed is an audio calibration method that is applied to an audio calibration system. The audio calibration system includes a terminal, a server and an audio playback device, and the method includes: playing, by the terminal, at least one kind of test signal in response to a sound collection command, and performing ambient sound collection to obtain target audio data; uploading, by the terminal, the target audio data to the server, performing, by the server, environmental acoustic parameter recognition on the target audio data to obtain target environmental acoustic parameters; generating, by the server, a calibration parameter of a digital equalizer based on the target environmental acoustic parameters to obtain a target calibration parameter; sending, by the server, the target calibration parameter to the terminal, and transmitting, by the terminal, the received target calibration parameter to the audio playback device.

12 Claims, 2 Drawing Sheets

(56) References Cited

U.S. PATENT DOCUMENTS

| | | | | |
|---|---|---|---|---|
| 2022/0137918 | A1* | 5/2022 | Sheen | H04R 29/001 |
| 2022/0295204 | A1* | 9/2022 | Garcia | G06N 20/00 |

FOREIGN PATENT DOCUMENTS

| | | | |
|---|---|---|---|
| CN | 118230767 | A | 6/2024 |
| CN | 118250603 | A | 6/2024 |
| JP | 2008228198 | A | 9/2008 |
| WO | 2022247494 | A1 | 12/2022 |
| WO | 2024053286 | A1 | 3/2024 |
| WO | WO-2024051638 | A1 * | 3/2024 |

OTHER PUBLICATIONS

Notification to Grant Patent Right for Invention issued in counterpart Chinese Patent Application No. 202411241898.1, dated Nov. 6, 2024.

* cited by examiner

AUDIO CALIBRATION METHOD AND SYSTEM, AND STORAGE MEDIUM

CROSS-REFERENCE TO RELATED APPLICATIONS

This application claims priority to Chinese Patent Application No. 202411241898.1, filed on Sep. 5, 2024, which is incorporated by reference herein in its entirety.

TECHNICAL FIELD

The present disclosure relates to the field of audio processing technologies, in particular to an audio calibration method, an audio calibration system, and a storage medium.

BACKGROUND

When an audio playback device plays in different environments, such differences as room sizes, materials of sound-reflecting objects, and placing positions of the audio playback device cause inconsistent sound quality, leading to bad user experiences. Conventional audio calibration technologies typically require professional devices and technicians to operate, which is costly, and involves a complicated calibration process, making them difficult to adapt to diverse acoustic environments.

SUMMARY

In a first aspect, the embodiments of the present disclosure provide an audio calibration method, applied to an audio calibration system, where the audio calibration system includes a terminal, a server and an audio playback device, and the method includes: playing, by the terminal, at least one kind of test signal in response to a sound collection command, and performing ambient sound collection to obtain target audio data; uploading, by the terminal, the target audio data to the server; performing, by the server, environmental acoustic parameter recognition on the target audio data to obtain target environmental acoustic parameters; generating, by the server, a calibration parameter of a digital equalizer based on the target environmental acoustic parameters to obtain a target calibration parameter; sending, by the server, the target calibration parameter to the terminal, and transmitting, by the terminal, the received target calibration parameter to the audio playback device; performing, by the audio playback device, calibration on a preset digital equalizer using the received target calibration parameter and performing audio playback through the calibrated digital equalizer.

Optionally, playing by the terminal at least one kind of test signal in response to the sound collection command and performing ambient sound collection to obtain target audio data includes: obtaining, by the terminal in response to the sound collection command, at least one kind of pre-generated test signal, and playing the at least one kind of test signal in a preset order; recording, by the terminal, ambient sound while playing the at least one kind of test signal; saving, by the terminal, the recorded ambient sound as the target audio data when the playing of the at least one kind of test signal is completed.

Optionally, the at least one kind of test signal includes an impulse signal, a logarithmic sine sweep signal and pink noise, the target audio data includes a response signal corresponding to each kind of test signal; performing by the server environmental acoustic parameter recognition on the target audio data to obtain the target environmental acoustic parameters includes: converting, by the server, the response signal corresponding to each kind of test signal into a pulse signal to obtain the pulse signal corresponding to each kind of test signal; and calculating, by the server, reverberation time, early decay time, and clarity of the pulse signal corresponding to each kind of test signal to obtain the target environmental acoustic parameters.

Optionally, converting by the server the response signal corresponding to each kind of test signal into the pulse signal to obtain the pulse signal corresponding to each kind of test signal includes: determining, by the server, a response signal corresponding to the impulse signal as a pulse signal corresponding to the impulse signal; performing, by the server, pulse signal extraction on a response signal corresponding to the logarithmic sine sweep signal to obtain a pulse signal corresponding to the logarithmic sine sweep signal; performing, by the server, cross-correlation between the pink noise and a response signal corresponding to the pink noise to obtain a pulse signal corresponding to the pink noise.

Optionally, performing by the server pulse signal extraction on the response signal corresponding to the logarithmic sine sweep signal to obtain the pulse signal corresponding to the logarithmic sine sweep signal includes: performing, by the server, Fourier transform on the response signal corresponding to the logarithmic sine sweep signal to obtain a first frequency response curve; performing, by the server, filtering on the first frequency response curve through a preset frequency domain filter for frequency domain characteristics of the logarithmic sine sweep signal to obtain a second frequency response curve; and performing, by the server, inverse filtering on the second frequency response curve to obtain the pulse signal corresponding to the logarithmic sine sweep signal.

Optionally, calculating by the server the reverberation time, the early decay time, and the clarity of the pulse signal corresponding to each kind of test signal to obtain the target environmental acoustic parameters includes: calculating, by the server, an energy decay curve, energy before a preset time, and total energy of the pulse signal corresponding to each kind of test signal based on the pulse signal corresponding to each kind of test signal; calculating, by the server based on the energy decay curve corresponding to each kind of test signal, a time required for a first preset value of energy decay to obtain the reverberation time corresponding to each kind of test signal; calculating, by the server based on the energy decay curve corresponding to each kind of test signal, a time required for the energy to decay from a maximum value to a second preset value, to obtain the early decay time for each test signal; calculating, by the server, the clarity corresponding to each kind of test signal based on a ratio of the energy before the preset time to the total energy corresponding to each kind of test signal; and combining, by the server, the reverberation time, the early decay time and the clarity corresponding to each kind of test signal to obtain the target environmental acoustic parameters.

Optionally, combining by the server the reverberation time, the early decay time and the clarity corresponding to each kind of test signal to obtain the target environmental acoustic parameters includes: performing, by the server, a weighted average of the reverberation time, the early decay time and the clarity corresponding to each kind of test signal to obtain the target environmental acoustic parameters.

Optionally, generating by the server the calibration parameter of the digital equalizer based on the target environmental acoustic parameters to obtain the target calibration parameter includes: performing, by the server, sound quality feature extraction on the target environmental acoustic parameters through a pre-trained sound quality feature extraction model to obtain a target sound quality feature; obtaining, by the server, a preset digital equalizer parameter corresponding to the target sound quality feature, to obtain a target digital equalizer parameter; and converting, by the server, the target digital equalizer parameter into a digital filter parameter to obtain the target calibration parameter.

Optionally, performing by the server sound quality feature extraction on the target environmental acoustic parameters through the pre-trained sound quality feature extraction model to obtain the target sound quality feature includes: performing, by the server, identification of sound quality irregularity factor on the target environmental acoustic parameters through the pre-trained sound quality feature extraction model to obtain the target sound quality feature.

Optionally, obtaining by the server the preset digital equalizer parameter corresponding to the target sound quality feature to obtain the target digital equalizer parameter includes: obtaining, by the server, the preset digital equalizer parameter and a calibration parameter value corresponding to the target sound quality feature based on a mapping relationship between preset sound quality irregularity factors and digital equalizer parameters, to obtain the target digital equalizer parameter.

Optionally, converting by the server the target digital equalizer parameter into the digital filter parameter to obtain the target calibration parameter includes: determining, by the server, the target digital filter corresponding to the target digital equalizer parameter based on a mapping relationship between preset digital equalizer parameters and digital filters; and calculating, by the server based on the target digital equalizer parameter, a coefficient of the target digital filter to obtain the target calibration parameter.

Optionally, performing by the audio playback device calibration on the preset digital equalizer using the received target calibration parameter and performing audio playback through the calibrated digital equalizer includes: using, by the audio playback device, the received target calibration parameter as a digital filter parameter to superimpose with a digital filter parameter in an audio playback channel and performing audio playback using the superimposed digital filter parameter.

In a second aspect, the embodiments of the present disclosure provide an audio calibration system including a terminal, a server and an audio playback device, where the audio calibration system performs the above-mentioned audio calibration method.

In a third aspect, the embodiments of the present disclosure provide a computer-readable storage medium having stored thereon computer-executable instructions, where the computer-executable instructions, when invoked and executed by a processor, cause the processor to implement the above-mentioned audio calibration method.

The additional features and advantages of the present disclosure will be given in the following description and part of which may become apparent, or may be understood through the implementation of the present disclosure. The objectives and other advantages of the present disclosure are achieved and obtained by the parts particularly pointed out in the description, claims, and drawings.

To make the objectives, features and advantages of the present disclosure more apparent and understandable, preferred embodiments are particularly exemplified below and described in detail as follows with reference to the accompanying drawings.

BRIEF DESCRIPTION OF THE DRAWINGS

In order to illustrate the technical solutions of the embodiments of the present disclosure or the prior art in a clearer manner, the drawings required for the description of the embodiments of the present disclosure or the prior art will be described hereinafter briefly. Apparently, the following drawings merely relate to some embodiments of the present disclosure, and based on these drawings, a person of ordinary skill in the art may obtain other drawings without any creative effort.

DETAILED DESCRIPTION OF THE EMBODIMENTS

In order to make the objectives, the technical solutions and the advantages of the present disclosure more apparent, the present disclosure will be described hereinafter in a clear and complete manner in conjunction with the drawings and embodiments. Apparently, the following embodiments merely relate to a part of, rather than all of, the embodiments of the present disclosure, and based on these embodiments, a person skilled in the art may, without any creative effort, obtain the other embodiments, which also fall within the scope of the present disclosure.

Terms such as "first", "second", "third" and "fourth" (if any) in the description, claims and drawings of the present disclosure are used to differentiate similar objects, and not necessarily used to describe a specific sequence or order. It should be appreciated that the data used in this way may be interchanged under an appropriate circumstance, so that the embodiment of the present disclosure described herein, for example, may be implemented in a sequence other than those illustrated or described herein. Moreover, terms "include", "have" and any other variation thereof are intended to encompass non-exclusive inclusion, such that a process, method, system, product or device including a series of steps or units includes not only those steps or elements, but also other steps or units not explicitly listed, or steps or units inherent in the process, method, system, product or device.

Figure 1:
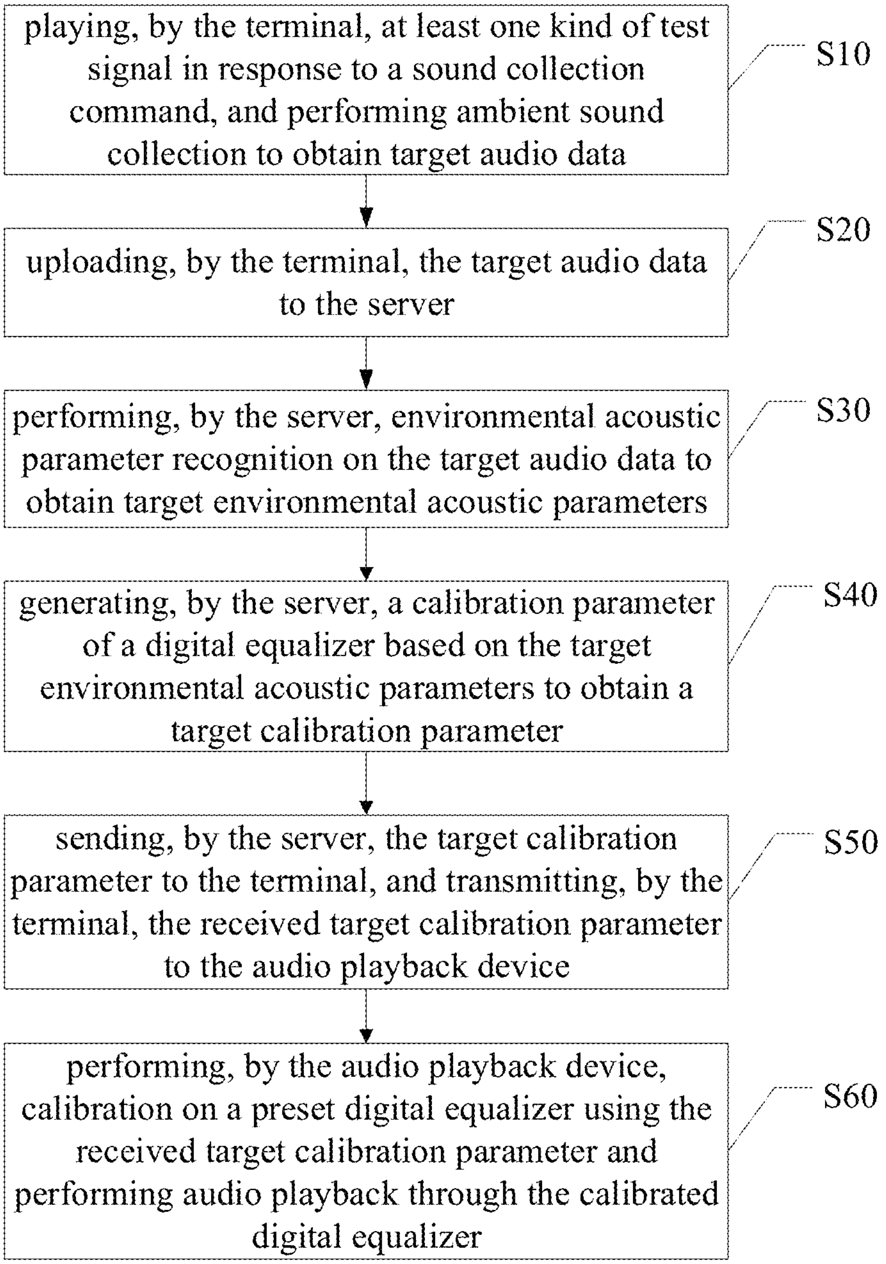
FIG. 1 is a flow chart illustrating an audio calibration method according to the embodiments of the present disclosure.

To facilitate comprehension, the specific process of the embodiments of the present disclosure is described below. Please refer to FIG. 1, the embodiments of the present disclosure are applied to an audio calibration system, the audio calibration system includes a terminal, a server and an audio playback device, and an audio calibration method according to the embodiments of the present disclosure includes the following steps.

Step S10, playing, by the terminal, at least one kind of test signal in response to a sound collection command, and performing ambient sound collection to obtain target audio data.

As can be appreciated, the audio calibration method in the embodiments of the present disclosure is triggered and executed by the terminal. The terminal provides a graphical user interface that displays a trigger control for a sound collection command. By operating the trigger control, the user triggers the sound collection command. In response to the sound collection command, the terminal begins playing at least one kind of test signal while simultaneously collecting ambient sound to obtain the collected target audio data. In one embodiment of the present disclosure, the terminal may also establish a connection with the audio playback device and control the audio playback device to play at least one kind of test signal. When the audio playback device sends a playback confirmation command to the terminal, the terminal begins collecting ambient sound to obtain the target audio data.

In one embodiment of the present disclosure, the graphical user interface of the terminal further includes an input control for environmental parameters, which may be any parameters that affect the audio playback effect, such as a size and shape of a space, a material of a wall, and/or a location of the audio playback device. Users may enter the environmental parameters using the input control. After receiving the inputted environmental parameters, the terminal may upload the environmental parameters to the server. The server determines one or more placing positions of the terminal based on the environmental parameters, or the terminal directly determines one or more placing positions based on the environmental parameters, where one or more placing position are used to indicate optimal positions for the terminal to play the test signal and collect the ambient sound. For example, the placing positions may be the center of the room, a corner of the room and so on, which will not be particularly defined herein.

In one embodiment of the present disclosure, prior to step S10, the terminal may further control the audio playback device to play a simulated sound wave. When the audio playback device sends a playback confirmation command to the terminal, the terminal begins collecting the response signal of the simulated sound wave and uploads the collected response signal to the server. After receiving the response signal of the simulated sound wave, the server performs acoustic field simulation calculation on the response signal to obtain environmental parameters of an environment where the audio playback device is located, for example, a wall/sound reflector in the environment where the audio playback device is located, reflection intensity of the wall/sound reflector, and so on, which may be used to determine and select the placing position of the terminal.

In one embodiment of the present disclosure, after obtaining the environmental parameters, a simulated layout of the environment may also be generated. The user may select any location on the simulated layout as the placing position through the terminal, or use the terminal to mark and display a calculated placing position on the simulated layout to guide the user in placing the terminal at the specified position for sound collection. The quantity of placing positions may be one or more, which is not particularly defined herein.

In one embodiment of the present disclosure, based on the inputted environmental parameters, at least one placing position may be generated. The graphical user interface of the terminal provides selection controls for all placing positions. After the user places the terminal at any one of these positions, the user may input the chosen placing position into the terminal through the selection control. Next, the terminal begins playing at least one kind of test signal while collecting the ambient sound. After the terminal completes playback of the test signal at one placing position, the graphical user interface displays the selection controls for unchosen placing positions. The user continues to select placing positions, and the terminal collects different audio data at different placing positions, thereby obtaining at least one piece of target audio data. In subsequent steps, the terminal uploads all target audio data to the server, and the server performs environmental acoustic parameter recognition on all the target audio data to obtain the target environmental acoustic parameters.

In one embodiment of the present disclosure, when the quantity of placing positions is greater than one, the terminal performs the above-mentioned step S10 at each placing position and uploads the target audio data corresponding to each placing position obtained after completing step S10 for each placing position to the server. This allows the server to perform environmental acoustic parameter recognition by combining the ambient sound collected from multiple placing positions, thereby improving the degree of adaptation between audio calibration and the actual audio playback environment, and subsequently enhancing the user experience.

Based on the above, after obtaining the placing position returned by the server or determined by itself, the terminal may further display guidance for the placing position via the graphical user interface. The guidance may be in one or more forms such as graphics, text, voice, etc., which will not be particularly defined herein. Using the guidance displayed by the terminal for the placing position, the user may place the terminal at the placing position and activate the trigger control for the sound collection command. The terminal begins playing at least one kind of test signal while collecting the ambient sound. It should be noted that the test signal played by the terminal is generated in advance rather than pre-recorded. Therefore, when the terminal plays the test signal and collects the ambient sound simultaneously, it does not cause squeak issue due to signal overlap, and the played test signal does not interfere with the collection of the ambient sound.

In this embodiment, the test signal may be categorized as an impulse signal, a logarithmic swept sine signal, pink noise, white noise, a sine wave, a square wave, a sawtooth wave, a triangular wave, a multi-tone signal, a stepped sine wave, a pulse signal, or a frequency modulation signal. The test signals may be generated through a predetermined function/algorithm, which will not be particularly defined herein.

As can be appreciated, the playback duration of each type of test signal, as well as the playback order for all test signals, are predetermined. Therefore, in the target audio data including the collected ambient sound, audio data of different time periods correspond to different kinds of test signals. For example, the terminal first plays an impulse signal with a duration of 20 seconds, the audio data from 0 s to 20 s in the target audio data is audio data corresponding to the impulse signal, which will not be particularly defined herein.

Step S20, uploading, by the terminal, the target audio data to the server.

In this embodiment, the terminal uploads the target audio data including the collected ambient sound to the server, so as to utilize the server's computational resources for the fast and accurate generation of equalizer calibration parameters, thereby improving the efficiency and accuracy of audio calibration. When the terminal collects target audio data corresponding to more than one placing position, it uploads all the collected target audio data, to ensure that the generation of equalizer calibration parameters is more accurate.

Step S30, performing, by the server, environmental acoustic parameter recognition on the target audio data to obtain target environmental acoustic parameters.

In one embodiment of the present disclosure, in a case that the terminal collects the target audio data corresponding to more than one placing position, the server first combines all the target audio data, to obtain combined target audio data, and performs environmental acoustic parameter recognition on the target audio data, so as to obtain the target environmental acoustic parameters. Specifically, when the server combines all the target audio data, it may calculate an average of all the target audio data to obtain the combined target audio data, or it may calculate a weighted average of all the target audio data based on weights corresponding to different placing positions to obtain the combined target audio data. Additionally, it may cluster all placing positions through a clustering algorithm and select a representative position from each cluster, then perform a weighted average of the target audio data corresponding to all representative positions to obtain the combined target audio data. The server may further combine all target audio data through other manners, which will not be particularly defined herein.

As can be appreciated, the environmental acoustic parameter is an important indicator used to describe and evaluate the characteristics of the ambient sound. Environmental acoustic parameters may include: Reverberation Time (RT), Early Decay Time (EDT), Clarity (C50/C80), Center Time (Ts), Definition (D50), Sound Pressure Level (SPL), Background Noise Level (BNL), etc. The server may extract features required for environmental acoustic parameter recognition from the target audio data and calculate the environmental acoustic parameters based on the extracted features, thereby obtaining the target environmental acoustic parameters, which are used to indicate the sound characteristics of the space where the ambient sound is collected. Specifically, in one embodiment, the server may perform environmental acoustic parameter recognition on the target audio data through a pre-trained artificial intelligence model, thereby obtaining the target environmental acoustic parameters.

In one embodiment of the present disclosure, after receiving the target audio data uploaded by the terminal, the server may further pre-process the target audio data, such as format conversion and noise reduction, to improve the accuracy of calibration of digital equalizer parameters.

Step S40, generating, by the server, a calibration parameter of a digital equalizer based on the target environmental acoustic parameters to obtain a target calibration parameter.

As can be appreciated, a digital equalizer is a virtual device used in digital signal processing to adjust gains of different frequency bands of an audio signal. It achieves such purposes as improving sound quality and compensating for frequency response by altering the amplitude of various frequency components in the audio signal, thereby enhancing playback effects. The digital equalizer performs gain/attenuation adjustment on the audio signal across different frequency bands by adjusting parameters of filters corresponding to different bands. The gain/attenuation adjustment for each band may be understood as applying a specific filter to that frequency band, where a frequency response of the filter is adjusted to increase or decrease the amplitude of the signal within that frequency band. Therefore, in this embodiment, the target calibration parameter includes a filter parameter of at least one frequency band, and the frequency band to be adjusted along with the filter parameter corresponding to the frequency band to be adjusted are determined based on the target environmental acoustic parameters.

It should be noted that audio signals may be divided into audio signals of different frequency bands based on frequencies of the audio signals, such as a high-frequency audio signal, a mid-frequency audio signal, and a low-frequency audio signal. The amplitude of different frequency bands may be adjusted using corresponding filters. By adjusting the amplitude of different frequency bands, the environmental acoustic parameters may be altered, thereby achieving that the audio playback matches the acoustic environment, and enhancing the user's audio playback experience. In one embodiment, the server generates the calibration parameter of the digital equalizer through a pre-trained artificial intelligence model based on the target environmental acoustic parameters, to obtain the target calibration parameter.

Step S50, sending, by the server, the target calibration parameter to the terminal, and transmitting, by the terminal, the received target calibration parameter to the audio playback device.

In this embodiment, the terminal acts as a medium between the server and the audio playback device, sending the target calibration parameter generated by the server to the audio playback device, making audio calibration more convenient for the audio playback device. A mobile phone may serve as the terminal and is connected with the audio playback device via a communication connection, which is not limited to cable connection or wireless connection. The cable connection includes a connection through a USB/Lightning interface, and the wireless connection includes a Wi-Fi/Bluetooth connection. It should be noted that the target calibration parameter may be transmitted to one or more audio playback devices, which will not be particularly defined herein.

Step S60, performing, by the audio playback device, calibration on a preset digital equalizer using the received target calibration parameter and performing audio playback through the calibrated digital equalizer.

It should be noted that the audio playback device includes a player equipped with a digital equalizer. After receiving the target calibration parameter via the terminal, the audio playback device inputs the target calibration parameter into the player having the digital equalizer, and performs calibration on original parameters of the digital equalizer. This allows audio playback through the corrected digital equalizer, achieving that the audio playback matches the acoustic environment, thereby enhancing the user's listening experience.

In the audio calibration method of the embodiments of the present disclosure, an ordinary terminal device with signal playback and sound collection capability plays a test signal and collects ambient sound, and uploads the ambient sound to a server, so as to use computational resources of the server to quickly and accurately identify the environmental acoustic parameter. Based on the environmental acoustic parameter, the server generates a digital equalizer parameter for a user to calibrate environmental acoustic defects. The calibration parameter generated by the server is sent to the audio playback device via the terminal. The audio playback device applies the calibration parameter to perform calibration on the digital equalizer, and performs audio playback using the calibrated parameter, thereby improving the compatibility of audio playback with the acoustic environment and enhancing the user's listening experience. The entire process is simple, requires no intervention from professionals, and reduces the operational cost of audio adjustments.

Figure 2:
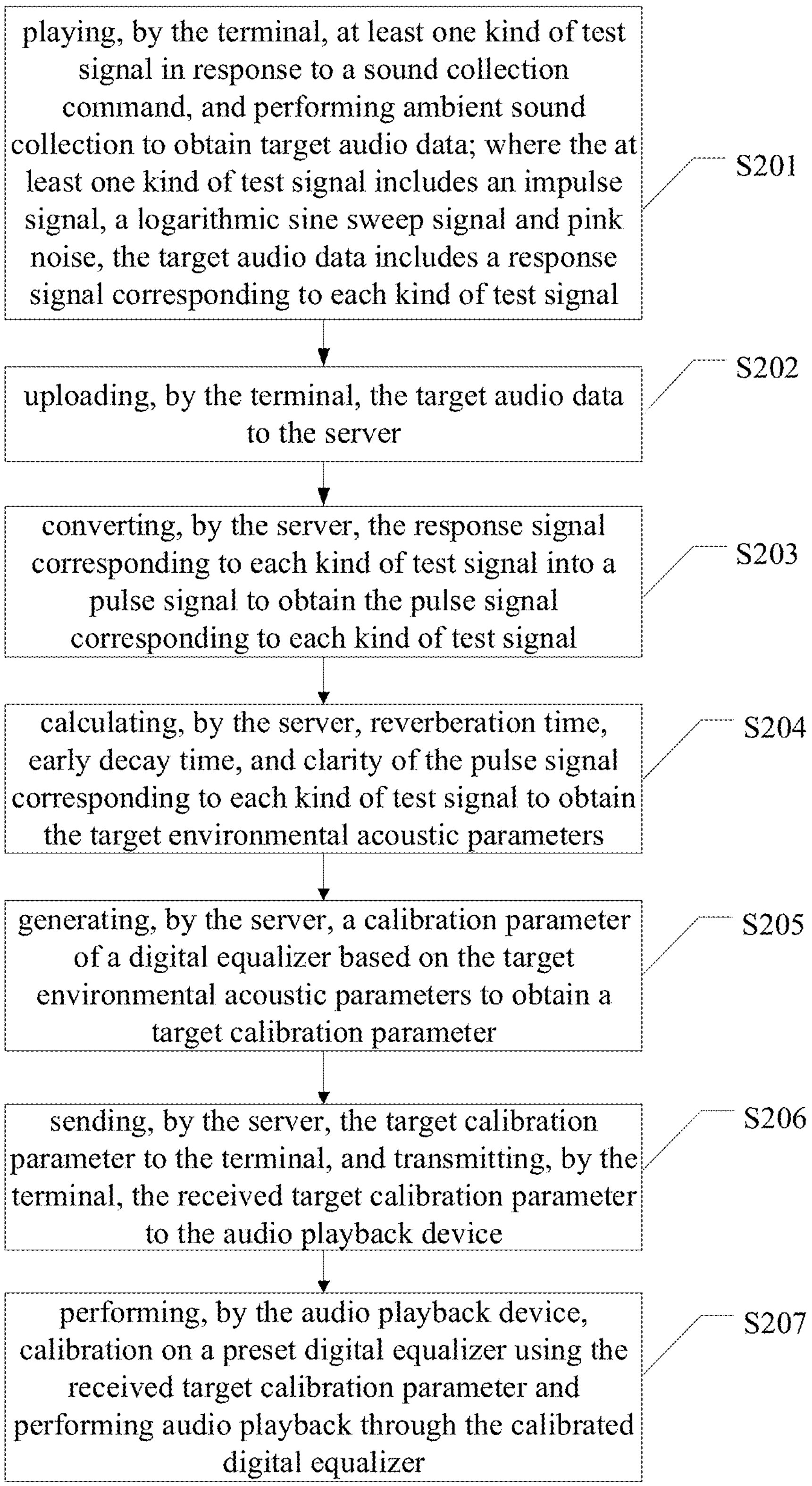
FIG. 2 is another flow chart illustrating the audio calibration method according to the embodiments of the present disclosure.

Please refer to FIG. 2, the audio calibration method according to the embodiments of the present disclosure includes the following steps.

Step S201, playing, by the terminal, at least one kind of test signal in response to a sound collection command, and performing ambient sound collection to obtain target audio data; where the at least one kind of test signal includes an impulse signal, a logarithmic sine sweep signal and pink noise, the target audio data includes a response signal corresponding to each kind of test signal.

In one embodiment of the present disclosure, in response to a sound collection command, the terminal obtains at least one kind of pre-generated test signal and plays the at least one kind of pre-generated test signal in a preset order. While playing at least one kind of test signal, the terminal records the ambient sound. When the playback of at least one kind of test signal is completed, the terminal saves the recorded ambient sound as the target audio data.

In this embodiment, the terminal sequentially plays three kinds of test signals: an impulse signal, a logarithmic sine swept signal, and pink noise, with the playback duration of each kind of test signal predetermined. Therefore, in the ambient sound recorded by the terminal, a response signal corresponding to each kind of test signal may be determined. By using different manners to calculate the environmental acoustic parameter for the response signals corresponding to different kind of test signals, it is able to improve the accuracy.

It should be noted that an impulse signal is a high-energy pulse signal that occurs in a very short time and may be used to measure an impulse response of an environment. A logarithmic sine sweep (Log Sweep) is a sine wave signal whose frequency changes logarithmically over time, covering a wide frequency range from low frequency to high frequency. The log sweep signal can uniformly excite all frequency components, allowing for a more comprehensive measurement of the environment's frequency response. The pink noise is a noise signal whose power spectral density is inversely proportional to frequency, meaning that the energy per octave is equal. The pink noise may be used for environmental noise simulation, providing a uniform spectral distribution.

Step S202, uploading, by the terminal, the target audio data to the server.

The process of implementing step S202 is similar to step S20, which will not be elaborated again herein.

Step S203, converting, by the server, the response signal corresponding to each kind of test signal into a pulse signal to obtain the pulse signal corresponding to each kind of test signal.

In one embodiment of the present disclosure, the server determines the response signal corresponding to the impulse signal as a pulse signal corresponding to the impulse signal. The server performs pulse signal extraction on the response signal corresponding to the logarithmic sine sweep signal to obtain a pulse signal corresponding to the logarithmic sine sweep signal. The server performs cross-correlation between the pink noise and a response signal corresponding to the pink noise to obtain a pulse signal corresponding to the pink noise.

In this embodiment, different kinds of test signals correspond to different manners of pulse signal extraction. For the impulse signal, since the impulse signal itself is approximately an ideal pulse signal, its response may be considered an approximation of a pulse response of an environmental space. For the logarithmic sine sweep signal, the pulse signal may be extracted through deconvolution, which will not be particularly defined herein. For pink noise, cross-correlation may be performed between the input pink noise signal and the collected response signal to obtain the pulse signal of the environmental space. Different kinds of test signals have different characteristics, when using different pulse signal extraction manners for different kinds of test signals, it is able to more accurately retain the pulse characteristics of the test signal and improve the accuracy of audio calibration.

In one embodiment of the present disclosure, performing by the server pulse signal extraction on the response signal corresponding to the logarithmic sine sweep signal to obtain the pulse signal corresponding to the logarithmic sine sweep signal includes: performing, by the server, Fourier transform on the response signal corresponding to the logarithmic sine sweep signal to obtain a first frequency response curve; performing, by the server, filtering on the first frequency response curve through a preset frequency domain filter for frequency domain characteristics of the logarithmic sine sweep signal to obtain a second frequency response curve; performing, by the server, inverse filtering on the second frequency response curve to obtain the pulse signal corresponding to the logarithmic sine sweep signal.

In this embodiment, for the logarithmic sine sweep signal, Fourier transform may be performed on the response signal to obtain a frequency response curve of the environmental space. Next, the frequency characteristics of the logarithmic sine sweep signal is removed using a preset frequency domain filter, thereby retaining only the effects of the environmental space. Finally, a pulse response of the environmental space is calculated using an inverse filtering algorithm, to obtain the pulse signal corresponding to the logarithmic sine sweep signal. In this embodiment, it is able to obtain the pulse signal corresponding to the logarithmic sine sweep signal more accurately, thereby improving the accuracy of audio calibration.

Step S204, calculating, by the server, reverberation time, early decay time, and clarity of the pulse signal corresponding to each kind of test signal to obtain the target environmental acoustic parameters.

In one embodiment of the present disclosure, the server calculates an energy decay curve, energy before a preset time, and total energy of the pulse signal corresponding to each kind of test signal based on the pulse signal corresponding to each kind of test signal. The server calculates, based on the energy decay curve corresponding to each kind of test signal, a time required for a first preset value of energy decay to obtain the reverberation time corresponding to each kind of test signal. The server calculates, based on the energy decay curve corresponding to each kind of test signal, a time required for the energy to decay from a maximum value to a second preset value, to obtain the early decay time for each test signal. The server calculates the clarity corresponding to each kind of test signal based on a ratio of the energy before the preset time to the total energy corresponding to each kind of test signal. The server combines the reverberation time, the early decay time and the clarity corresponding to each kind of test signal to obtain the target environmental acoustic parameters.

In this embodiment, the server may calculate reverberation time, early decay time, and clarity as environmental acoustic parameters based on the pulse signal corresponding to each kind of test signal. Specifically, the server calculates a square of the pulse signal corresponding to each kind of test signal and takes a logarithm of the square of the pulse signal to obtain the energy decay curve corresponding to each kind of test signal. The reverberation time and early decay time may be calculated through the energy decay curve. The reverberation time is represented by the time required for the sound pressure level to decrease by 60 dB. Hence, based on the energy decay curve corresponding to each kind of test signal, the time required for 60 dB of energy decay is calculated, so as to obtain the reverberation time corresponding to each kind of test signal. The early decay time is typically represented by the time required for the sound pressure level to decrease by 10 dB. Thus, based on the energy decay curve for each kind of test signal, the time required for energy to decay from a maximum value to 10 dB is calculated, so as to obtain the early decay time for each kind of test signal. Clarity is a ratio of early energy to late energy, with commonly used metrics being C50 and C80, representing ratios of energy within first 50 milliseconds and 80 milliseconds, respectively, to the total energy. For example, in the case of C50, the server calculates the energy from 0 to 50 milliseconds, calculates the total energy of the entire response signal, and calculates a ratio of the energy within 0-50 milliseconds to the total energy, taking a logarithm of the ratio, so as to obtain the clarity corresponding to each kind of test signal.

In one embodiment of the present disclosure, the reverberation time, early decay time, and clarity corresponding to each kind of test signal may be directly combined to obtain the target environmental acoustic parameters, or, combined using a preset algorithm to obtain the target environmental acoustic parameters, which will not be particularly defined herein.

In one embodiment of the present disclosure, combining by the server the reverberation time, the early decay time and the clarity corresponding to each kind of test signal to obtain the target environmental acoustic parameters includes: performing, by the server, a weighted average on the reverberation time, the early decay time and the clarity corresponding to each kind of test signal to obtain the target environmental acoustic parameters. In this embodiment, different test signals may correspond to different weights. Based on the weight value corresponding to each kind of test signal, a weighted average is performed on the reverberation time, the early decay time and the clarity corresponding to each kind of test signal to obtain target reverberation time, target early decay time and target clarity, thereby to obtain target environmental acoustic parameters.

Step S205, generating, by the server, a calibration parameter of a digital equalizer based on the target environmental acoustic parameters to obtain a target calibration parameter.

In one embodiment of the present disclosure, the server performs sound quality feature extraction on the target environmental acoustic parameters through a pre-trained sound quality feature extraction model to obtain a target sound quality feature. The server obtains a preset digital equalizer parameter corresponding to the target sound quality feature based on a preset mapping relationship between sound quality features and digital equalizer parameters, to obtain a target digital equalizer parameter. The server calculates, based on a difference value between a preset digital equalizer parameter value corresponding to the target digital equalizer parameter and a standard digital equalizer parameter value, a calibration parameter value corresponding to the target digital equalizer parameter to obtain a target digital equalizer parameter value, where the preset digital equalizer parameter value is a parameter value corresponding to the target digital equalizer parameter of the audio playback device. The server converts the target digital equalizer parameter value into a digital filter parameter value to obtain a target calibration parameter value.

In this embodiment, the audio quality feature in the target environmental parameters is identified using an artificial intelligence model. Based on the audio quality feature, the digital equalizer parameter to be adjusted is obtained, so as to obtain the target digital equalizer parameter. Next, a parameter value corresponding to the target digital equalizer parameter of the audio playback device is obtained, which is the preset digital equalizer parameter value corresponding to the target digital equalizer parameter. A difference between the preset digital equalizer parameter value and a corresponding standard digital equalizer parameter value is calculated to obtain the calibration parameter value corresponding to the target digital equalizer parameter, i.e., the target digital equalizer parameter value. Finally, the target digital equalizer parameter value is converted into a value of digital filter parameter, so as to obtain the target calibration parameter value that can be directly applied to the audio playback device.

In this embodiment, the pre-trained audio quality feature extraction model is an artificial intelligence model, which may include a plurality of Long Short Term Memory (LSTM) networks and fully connected layers. The LSTM networks are used to capture time dependencies of the target environmental acoustic parameters, and the fully connected layers are used to classify and output the target audio quality features. The audio quality feature extraction model may include other networks, specifically, in one embodiment, the pre-trained audio quality feature extraction model includes a convolutional neural network, a recurrent neural network and a deep neural network. When the server performs sound quality feature extraction on the target environmental acoustic parameters through the pre-trained sound quality feature extraction model to obtain the target sound quality feature, the server performs local audio feature extraction on the target environmental acoustic parameters through the convolutional neural network to obtain local audio feature information, identify a timing sequence dependency relationship in the local audio feature information through the recurrent neural network to obtain timing sequence audio feature information, and performs audio feature classification on the timing sequence audio feature information through the deep neural network to obtain the target audio quality feature.

In this embodiment, the Convolutional Neural Network (CNN) has such advantages as weight sharing and local connections, which help reduce the quantity of parameters and computational load of the model. Convolution operations are performed through convolutional kernels in the CNN and the target environmental acoustic parameters, so as to obtain the local audio information such as reverberation time feature, early decay time feature, and clarity feature. The Recurrent Neural Network (RNN) can capture the timing sequence dependency of the local audio feature information, so as to extract the timing sequence audio feature information of the audio quality features that vary over time. The Deep Neural Network (DNN) has a powerful nonlinear mapping capability and can learn and recognize complex mapping relationships. When the number of layers and neurons in the DNN are increased, the classification performance can be improved. Audio feature classification performed on the timing sequence audio feature information through the DNN to obtain the target audio quality feature.

In this embodiment, different audio quality features are pre-associated with different digital equalizer parameters. The target digital equalizer parameter is the digital equalizer parameter corresponding to the target audio quality feature. In one embodiment, when the server obtains the preset digital equalizer parameters corresponding to the target audio quality feature to obtain the target digital equalizer parameter, it obtains the preset digital equalizer parameters corresponding to the target audio quality feature to obtain the target digital equalizer parameter according to a predefined mapping relationship between audio quality features and digital equalizer parameters. For example, if the target audio quality feature is relatively low reverberation, gain values for the mid and low frequencies may be increased to enhance the reverberation time. Thus, digital equalizer parameters corresponding to the target audio quality feature with relatively low reverberation are the gain values of the mid and low frequencies.

In one embodiment of the present disclosure, the target calibration parameter value corresponding to the target digital equalizer parameter may also be pre-associated through a mapping relationship. For example, each time the reverberation time exceeds preset reverberation time by 0s-0.5 s, gain values for the mid and low frequencies are increased by 1 dB, which will not be particularly defined herein.

In one embodiment of the present disclosure, the server determines the target digital filter corresponding to the target digital equalizer parameter based on a mapping relationship between preset digital equalizer parameters and digital filters, and the server calculates, based on the target digital equalizer parameter value, a coefficient of the target digital filter to obtain the target calibration parameter. As can be appreciated, different frequency bands correspond to different digital filters. Based on the frequency band corresponding to the target digital equalizer parameter, the corresponding target digital filter is determined. Next, through a coefficient calculation function corresponding to the target digital filter, a coefficient of the target digital filter corresponding to the target digital equalizer parameter value is calculated to obtain the target calibration parameter. In this case, the coefficient of the target digital filter may be used, and the target digital filter is applied in real-time signal processing for audio signal playback.

Step S206, sending, by the server, the target calibration parameter to the terminal, and transmitting, by the terminal, the received target calibration parameter to the audio playback device.

The process of implementing step S206 is similar to step S50, which will not be elaborated again herein.

Step S207, performing, by the audio playback device, calibration on a preset digital equalizer using the received target calibration parameter and performing audio playback through the calibrated digital equalizer.

In one embodiment of the present disclosure, the audio playback device uses the received target calibration parameter as a digital filter parameter to superimpose with a digital filter parameter in an audio playback channel and performing audio playback using the superimposed digital filter parameter. In this embodiment, the audio playback device superimposes the target calibration parameter onto the existing audio processing path. In this case, all audio signals played by the audio playback device are calibrated using the target calibration parameter, so as to adapt to the current acoustic environment.

In the audio calibration method of the embodiments of the present disclosure, an ordinary terminal device with signal playback and sound collection capability plays a test signal and collects ambient sound, and uploads the ambient sound to a server, so as to use computational resources of the server to quickly and accurately identify reverberation time, early decay time, and clarity of the environment. Based on these parameters, the server generates a digital equalizer parameter for a user to calibrate environmental acoustic defects. The calibration parameter generated by the server is sent to the audio playback device via the terminal. The audio playback device applies the calibration parameter to perform calibration on the digital equalizer, and performs audio playback using the calibrated parameter, thereby improving the compatibility of audio playback with the acoustic environment and enhancing the user's listening experience. The entire process is simple, requires no intervention from professionals, and reduces the operational cost of audio adjustments.

The embodiments of the present disclosure further provide an audio calibration system including a terminal, a server and an audio playback device, where the audio calibration system performs the above-mentioned audio calibration method.

The embodiments of the present disclosure further provide a computer-readable storage medium having stored thereon computer-executable instructions, where the computer-executable instructions, when invoked and executed by a processor, cause the processor to implement the above-mentioned audio calibration method.

The embodiments of the present disclosure further provide a computer program product of the audio calibration method, audio calibration system and storage medium, including a computer-readable storage medium having stored thereon a program code, where instructions included in the program code may be used to execute the method in the previous method embodiments. For specific implementation details, refer to the method embodiments, which will not be elaborated again herein.

Those skilled in the art may clearly understand that, for the sake of convenience and brevity of description, the specific working process of the system and apparatus mentioned above can refer to the corresponding processes in the method embodiments, which are not elaborated again herein.

Unless otherwise specified, such words as "install" and "connect" may have a general meaning, e.g., fixed connection, detachable connection or integral connection, a mechanic connection or an electrical connection, or direct connection or indirect connection via an intermediate component, or communication between two components. The meanings of these words may be understood by a person skilled in the art according to the practical need.

If the function is implemented in the form of software functional units and sold or used as an independent product, it may be stored in a computer readable storage medium. Based on this understanding, essence of the technical solutions of the present application, or the part contributing to the prior art, or all or part of the technical solutions, may be embodied in the form of a software product. The computer software product is stored in a storage medium, and includes a number of instructions to enable a computer device (which may be a personal computer, a server, or a network device, etc.) to perform all or part of the steps of method described in the various embodiments of the present application. The storage medium includes a USB flash disk, a mobile hard disk, a read-only memory (Read-Only Memory, ROM), a random access memory (Random Access Memory, RAM), a magnetic disk, an optical disk, or other medium which can store program code.

In the above description, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

It should be noted that the above embodiments are merely specific implementations of the present disclosure and are used to illustrate the technical solutions of the present disclosure, but shall not be construed as limiting the present disclosure. The scope of the present disclosure is not limited to these embodiments. As can be appreciated by a person skilled in the art, although the present disclosure has been described in detail with reference to the foregoing embodiments, any modifications or variations of the technical solutions in the aforementioned embodiments, or equivalent replacements of part of the technical features within the scope of the disclosed technology, may still be made by those skilled in the art. These modifications, variations or replacements do not make the essence of the corresponding technical solutions depart from the spirit and scope of the technical solutions of the embodiments of the present application. The scope of the present disclosure shall be subject to the scope defined by the appended claims.

What is claimed is:

1. An audio calibration method, applied to an audio calibration system, wherein the audio calibration system comprises a terminal, a server and an audio playback device, and the method comprises:

playing, by the terminal, at least one kind of test signal in response to a sound collection command, and performing ambient sound collection to obtain target audio data;

uploading, by the terminal, the target audio data to the server;

performing, by the server, environmental acoustic parameter recognition on the target audio data to obtain target environmental acoustic parameters;

performing, by the server, sound quality feature extraction on the target environmental acoustic parameters through a pre-trained sound quality feature extraction model to obtain a target sound quality feature;

obtaining, by the server, a preset digital equalizer parameter corresponding to the target sound quality feature based on a preset mapping relationship between sound quality features and digital equalizer parameters, to obtain a target digital equalizer parameter;

calculating, by the server based on a difference value between a preset digital equalizer parameter value corresponding to the target digital equalizer parameter and a standard digital equalizer parameter value, a calibration parameter value corresponding to the target digital equalizer parameter to obtain a target digital equalizer parameter value; wherein the preset digital equalizer parameter value is a parameter value corresponding to the target digital equalizer parameter of the audio playback device;

converting, by the server, the target digital equalizer parameter value into a digital filter parameter value to obtain a target calibration parameter value;

sending, by the server, the target calibration parameter to the terminal, and transmitting, by the terminal, the received target calibration parameter to the audio playback device; and performing, by the audio playback device, calibration on a preset digital equalizer using the received target calibration parameter and performing audio playback through the calibrated digital equalizer.

2. The method according to claim 1, wherein playing by the terminal at least one kind of test signal in response to the sound collection command and performing ambient sound collection to obtain target audio data comprises:

obtaining, by the terminal in response to the sound collection command, at least one kind of pre-generated test signal, and playing the at least one kind of test signal in a preset order;

recording, by the terminal, ambient sound while playing the at least one kind of test signal; and saving, by the terminal, the recorded ambient sound as the target audio data when the playing of the at least one kind of test signal is completed.

3. The method according to claim 1, wherein the at least one kind of test signal comprises an impulse signal, a logarithmic sine sweep signal and pink noise; the target audio data comprises a response signal corresponding to each kind of test signal;

wherein performing by the server environmental acoustic parameter recognition on the target audio data to obtain the target environmental acoustic parameters comprises:

converting, by the server, the response signal corresponding to each kind of test signal into a pulse signal to obtain the pulse signal corresponding to each kind of test signal; and calculating, by the server, reverberation time, early decay time, and clarity of the pulse signal corresponding to each kind of test signal to obtain the target environmental acoustic parameters.

4. The method according to claim 3, wherein converting by the server the response signal corresponding to each kind of test signal into the pulse signal to obtain the pulse signal corresponding to each kind of test signal comprises:

determining, by the server, a response signal corresponding to the impulse signal as a pulse signal corresponding to the impulse signal;

performing, by the server, pulse signal extraction on a response signal corresponding to the logarithmic sine sweep signal to obtain a pulse signal corresponding to the logarithmic sine sweep signal; and performing, by the server, cross-correlation between the pink noise and a response signal corresponding to the pink noise to obtain a pulse signal corresponding to the pink noise.

5. The method according to claim 4, wherein performing by the server pulse signal extraction on the response signal corresponding to the logarithmic sine sweep signal to obtain the pulse signal corresponding to the logarithmic sine sweep signal comprises:

performing, by the server, Fourier transform on the response signal corresponding to the logarithmic sine sweep signal to obtain a first frequency response curve;

performing, by the server, filtering on the first frequency response curve through a preset frequency domain filter for frequency domain characteristics of the logarithmic sine sweep signal to obtain a second frequency response curve; and performing, by the server, inverse filtering on the second frequency response curve to obtain the pulse signal corresponding to the logarithmic sine sweep signal.

6. The method according to claim 3, wherein calculating by the server the reverberation time, the early decay time, and the clarity of the pulse signal corresponding to each kind of test signal to obtain the target environmental acoustic parameters comprises:

calculating, by the server, an energy decay curve, energy before a preset time, and total energy of the pulse signal corresponding to each kind of test signal based on the pulse signal corresponding to each kind of test signal;

calculating, by the server based on the energy decay curve corresponding to each kind of test signal, a time required for a first preset value of energy decay to obtain the reverberation time corresponding to each kind of test signal;

calculating, by the server based on the energy decay curve corresponding to each kind of test signal, a time required for the energy to decay from a maximum value to a second preset value, to obtain the early decay time for each test signal;

calculating, by the server, the clarity corresponding to each kind of test signal based on a ratio of the energy before the preset time to the total energy corresponding to each kind of test signal; and combining, by the server, the reverberation time, the early decay time and the clarity corresponding to each kind of test signal to obtain the target environmental acoustic parameters.

7. The method according to claim 6, wherein combining by the server the reverberation time, the early decay time and the clarity corresponding to each kind of test signal to obtain the target environmental acoustic parameters comprises:

performing, by the server, a weighted average on the reverberation time, the early decay time and the clarity corresponding to each kind of test signal to obtain the target environmental acoustic parameters.

8. The method according to claim 1, wherein the pre-trained audio quality feature extraction model comprises a convolutional neural network, a recurrent neural network and a deep neural network;

wherein performing by the server sound quality feature extraction on the target environmental acoustic parameters through the pre-trained sound quality feature extraction model to obtain the target sound quality feature comprises:

performing, by the server, local audio feature extraction on the target environmental acoustic parameters through the convolutional neural network to obtain local audio feature information;

identifying, by the server, a timing sequence dependency relationship in the local audio feature information through the recurrent neural network to obtain timing sequence audio feature information; and performing, by the server, audio feature classification on the timing sequence audio feature information through the deep neural network to obtain the target audio quality feature.

9. The method according to claim 1, wherein converting by the server the target digital equalizer parameter value into the digital filter parameter value to obtain the target calibration parameter value comprises:

determining, by the server, the target digital filter corresponding to the target digital equalizer parameter based on a mapping relationship between preset digital equalizer parameters and digital filters; and calculating, by the server based on the target digital equalizer parameter value, a coefficient of the target digital filter to obtain the target calibration parameter.

10. The method according to claim 1, wherein performing by the audio playback device calibration on the preset digital equalizer using the received target calibration parameter and performing audio playback through the calibrated digital equalizer comprises:

using, by the audio playback device, the received target calibration parameter as a digital filter parameter to superimpose with a digital filter parameter in an audio playback channel and performing audio playback using the superimposed digital filter parameter.

11. An audio calibration system, comprising a terminal, a server and an audio playback device, wherein the audio calibration system performs the audio calibration method according to claim 1.

12. A non-transitory computer-readable storage medium having stored thereon computer-executable instructions, wherein the computer-executable instructions, when invoked and executed by a processor, cause the processor to implement the audio calibration method according to claim 1.

* * * * *